US011087040B2

(12) United States Patent
Liu et al.

(10) Patent No.: US 11,087,040 B2
(45) Date of Patent: Aug. 10, 2021

(54) METHOD FOR RESISTING DYNAMIC LOAD IN HIGH TEMPERATURE PIPELINE

(71) Applicant: China Nuclear Power Engineering Co., Ltd., Beijing (CN)

(72) Inventors: Shubin Liu, Beijing (CN); Ming Wu, Beijing (CN); Shuangwang Zhang, Beijing (CN); Li Chen, Beijing (CN); Yuanzhu Wang, Beijing (CN); Feng Sheng, Beijing (CN)

(73) Assignee: China Nuclear Power Engineering Co., Ltd., Beijing (CN)

( * ) Notice: Subject to any disclaimer, the term of this patent is extended or adjusted under 35 U.S.C. 154(b) by 408 days.

(21) Appl. No.: 16/131,804

(22) Filed: Sep. 14, 2018

(65) Prior Publication Data

US 2019/0087528 A1 Mar. 21, 2019

(30) Foreign Application Priority Data

Sep. 15, 2017 (CN) .......................... 201710834417.1

(51) Int. Cl.
*G06F 30/17* (2020.01)
*G06F 30/20* (2020.01)
(Continued)

(52) U.S. Cl.
CPC .............. *G06F 30/17* (2020.01); *G06F 30/20* (2020.01); *G06F 2111/04* (2020.01);
(Continued)

(58) Field of Classification Search
CPC ...... G06F 30/17; G06F 30/20; G06F 2111/04; G06F 2113/14
(Continued)

(56) References Cited

U.S. PATENT DOCUMENTS

| 4,110,731 A | * | 8/1978 | Elswood | ................. G01V 1/181 367/171 |
| 4,266,287 A | * | 5/1981 | Elswood | ................. G01D 11/12 367/171 |

(Continued)

FOREIGN PATENT DOCUMENTS

EP 0349014 A2 1/1990

OTHER PUBLICATIONS

Areva NP Inc. ("U.S. EPR Piping Analysis and Pipe Support Design Topical Report", 2010, pp. 1-98) (Year: 2010).*
(Continued)

*Primary Examiner* — Iftekhar A Khan
(74) *Attorney, Agent, or Firm* — The Webb Law Firm

(57) ABSTRACT

Disclosed is a design method for resisting a dynamic load in a high temperature pipeline. The method includes the following steps: a first calculation step, calculating to obtain a temperature deformation displacement of each point of the pipeline; a second calculation step, calculating to obtain a modal result of the pipeline and a dynamic response displacement of each point of the pipeline; a comprehensive analysis step, comprehensively analyzing the temperature deformation displacement and displacements of the vibration modes of respective orders of the pipeline to find a position at which a rigid constraint is required to be added, and applying the rigid constraint along a direction in which the temperature deformation displacement is not affected substantially; and a determination step, calculating a stress of the pipeline and a reaction force of the rigid constraint to determine whether the stress and the reaction force meet design requirements.

9 Claims, 3 Drawing Sheets

(51) Int. Cl.
  *G06F 111/04* (2020.01)
  *G06F 111/10* (2020.01)
  *G06F 113/14* (2020.01)
  *G06F 119/08* (2020.01)
(52) U.S. Cl.
  CPC ....... *G06F 2111/10* (2020.01); *G06F 2113/14* (2020.01); *G06F 2119/08* (2020.01); *Y02E 60/00* (2013.01); *Y04S 40/20* (2013.01)
(58) Field of Classification Search
  USPC .......................................................... 703/1
  See application file for complete search history.

(56) References Cited

U.S. PATENT DOCUMENTS

| | | | | |
|---|---|---|---|---|
| 4,761,261 A * | 8/1988 | Garabedian | ............. | G21C 1/03 376/402 |
| 4,832,305 A * | 5/1989 | Asmundsson | ............ | F16L 3/16 248/636 |
| 4,909,981 A * | 3/1990 | Garabedian | ............. | G21C 1/03 376/293 |
| 10,510,454 B2 * | 12/2019 | Chen | ........................ | G21D 1/04 |
| 2006/0167188 A1 * | 7/2006 | Sauvant-Moynot | .... | C08L 63/00 525/396 |
| 2010/0059230 A1 * | 3/2010 | Skeels | ................... | E21B 17/012 166/360 |
| 2013/0057098 A1 * | 3/2013 | Zhang | ................. | H02K 49/108 310/104 |
| 2013/0132040 A1 * | 5/2013 | Shook | .................... | G06F 30/18 703/1 |
| 2013/0239909 A1 * | 9/2013 | Jiang | ..................... | F22B 29/067 122/1 A |
| 2014/0113828 A1 * | 4/2014 | Gilbert | ................. | H01L 39/225 505/100 |
| 2015/0192223 A1 * | 7/2015 | Walters | .................. | B29C 63/34 405/184.2 |
| 2016/0056715 A1 * | 2/2016 | Arisawa | ................ | H02M 3/156 323/282 |
| 2017/0283901 A1 * | 10/2017 | Hu | ........................ | C22C 38/001 |
| 2017/0321879 A1 * | 11/2017 | Lakhov | ................... | F22B 1/162 |
| 2018/0038542 A1 * | 2/2018 | Welles | ............... | C09J 123/0815 |
| 2018/0067003 A1 * | 3/2018 | Michiwaki | ................ | G01L 1/22 |
| 2018/0238472 A1 * | 8/2018 | Liu | .......................... | F16K 1/02 |
| 2018/0288907 A1 * | 10/2018 | Richards | ............ | H05K 7/20927 |

OTHER PUBLICATIONS

Liu et al. ("Application of Peps in Stress Analysis of Nuclear Piping", Journal of Applied Mathematics and Physics, 2013, 1, 57-61) (Year: 2013).*
Junwei et al. ("The Analysis of Effect on the Piping Due to the Displacement of EPR Nuclear Island Bulidings", ASME, 2010, pp. 1-6) (Year: 2010).*
Liu et al. ("Postbuckling Behavior of Axially-Compressed Strips With Discrete Rigid Constraints—A Numerical Study", ASME, 2015, pp. 1-8) (Year: 2015).*
Wigaard et al. ("Designing Structural Damping to Avoid Resonance Problems in Structures, Piping and Subsea Equipment: Risk Reduction and Fatigue Life Improvement", ASME, 2005, pp. 1-8) (Year: 2005).*
K.V. Subramanian (Evolution of Seismic Design of Structures, Systems and Components of Nuclear Power Plants, ISET Journal of Earthquake Technology, 2010, pp. 87-108) (Year: 2010).*
Paolacci, et al., Seismic Analysis and Component Design of Refinery Piping Systems, Thematic Conference on Computational Methods in Structural Dynamics and Earthquake Engineering, 2011, p. 25-28.

* cited by examiner

METHOD FOR RESISTING DYNAMIC LOAD IN HIGH TEMPERATURE PIPELINE

CROSS-REFERENCE TO RELATED APPLICATION

This application claims priority to Chinese Patent Application No. 201710834417.1 filed Sep. 15, 2017, the disclosure of which is hereby incorporated in its entirety by reference.

BACKGROUND OF THE INVENTION

Field of the Invention

The present disclosure relates to a dynamic load analysis technology, and particularly, relates to a design method for resisting a dynamic load in a high temperature pipeline.

Description of Related Art

A variety of loads need to be considered in pipeline mechanics calculation in the industrial community, especially for nuclear power plants, all temperature operating conditions and influence of dynamic loads such as earthquake etc. should be considered. It is well known that a temperature load and a seismic load of a pipeline are a pair of contradictions. A condition for satisfying the temperature load is to increase a flexibility of a pipeline system (or to reduce a rigidity of a pipeline system). On the contrary, a condition for satisfying the seismic load is to increase the rigidity of the pipeline system (or to reduce the flexibility of the pipeline system). Altering the flexibility (or rigidity) of the pipeline is a basic skill for a person skilled in the art.

In actually designing an engineering pipeline arrangement, it can be easily realized to simply satisfy a requirement for a temperature stress, as long as the flexibility is large enough and the deformation is not restricted. Meanwhile, it is also easy to simply satisfy a requirement for a seismic stress, as long as the rigidity is large enough. However, it is not easy to satisfy a requirement for both the temperature stress and the seismic stress simultaneously. The most commonly-used method at present is to install a bracket at a position where an antiseismic rigidity needs to be increased, and a snubber will be provided at that position when it is required to make a space for temperature deformation displacement there. The snubber does not act as a constraint for a low-speed load (such as a temperature deformation), but acts as a rigid support for a high-speed load (such as a seismic force).

A cost of a snubber is very high, and is far higher than that of a rigid bracket. Using snubbers in a large quantity will not only increase the cost of components of a pipeline system but also greatly increase an operation cost of the pipeline system, because the snubber itself may cease to be effective, for example, it is prescribed in nuclear power plants that 10% of the snubbers must be checked and repaired every year. This needs to uninstall the snubber, test integrity of the snubber on a specific equipment, and replace or repair it after confirmation, or re-install it back to the pipeline system in case of no problem. This procedure reduces economic performance of the pipeline system.

SUMMARY OF THE INVENTION

An object of the present disclosure is to provide a design method for resisting a dynamic load in a high temperature pipeline to solve the problems existing in the prior art. The design method uses a rigid bracket as much as possible in piping design, which avoids use of a snubber to reduce a construction cost of a pipeline system.

A technical solution of the present disclosure resides in a design method for resisting a dynamic load in a high temperature pipeline, and the design method comprises the following steps: a first calculation step, calculating to obtain a temperature deformation displacement of each point of the pipeline; a second calculation step, calculating to obtain a modal result of the pipeline and a dynamic response displacement of each point of the pipeline, the modal result including all necessary natural frequencies and vibration modes of respective orders; a comprehensive analysis step, comprehensively analyzing the temperature deformation displacement and displacements of the vibration modes of respective orders of the pipeline to find a position at which a rigid constraint is required to be added to reduce the dynamic response displacement, and applying the rigid constraint along a direction in which the temperature deformation displacement is not affected substantially; and a determination step, calculating a stress of the pipeline after the rigid constraint is applied and a reaction force of the rigid constraint to determine whether the stress of the pipeline and the reaction force of the rigid constraint satisfy design requirements.

According to one aspect of the present disclosure, as mentioned in the above design method for resisting a dynamic load in a high temperature pipeline, a temperature deformation displacement diagram of a pipeline system is obtained in the first calculation step, and the temperature deformation displacement diagram is a three-dimensional graph including a magnitude and a direction of the temperature deformation displacement of each point of the pipeline.

According to one aspect of the present disclosure, as mentioned in the above design method for resisting a dynamic load in a high temperature pipeline, the dynamic response displacement in the comprehensive analysis step is a combination of the displacements of the vibration modes of respective orders.

According to one aspect of the present disclosure, as mentioned in the above design method for resisting a dynamic load in a high temperature pipeline, the position at which the rigid constraint is required to be added in the comprehensive analysis step is a position where a direction of the dynamic response displacement does not coincide with a direction of the temperature deformation displacement.

According to one aspect of the present disclosure, as mentioned in the above design method for resisting a dynamic load in a high temperature pipeline, in the comprehensive analysis step, the rigid constraint is applied in a plane perpendicular to a direction of the temperature deformation displacement.

According to one aspect of the present disclosure, when it is determined that the stress of the pipeline or the reaction force of the rigid constraint does not satisfy the design requirements in the determination step, returning to the first calculation step for redesign.

According to one aspect of the present disclosure, in the comprehensive analysis step, a plurality of rigid constraints are applied at one position where the temperature deformation displacement is not affected substantially, and a direction in which a resultant force of the plurality of rigid constraints is exerted on the pipeline is perpendicular to a direction of the temperature deformation displacement at the one position of the pipeline.

According to one aspect of the present disclosure, in the comprehensive analysis step, a plurality of rigid constraints are applied at each of a plurality of positions where the temperature deformation displacement is not affected substantially, and a direction in which a resultant force of the plurality of rigid constraints is exerted on the pipeline is perpendicular to a direction of the temperature deformation displacement at each position of the pipeline.

According to one aspect of the present disclosure, the dynamic load is a seismic load, the rigid constraint is a hinged beam, and a unidirectional compressive or tensile force is only generated in the hinged beam by the pipeline under the seismic load.

According to one aspect of the present disclosure, two rigid constraints with an intersection angle of 90 degrees are applied along a direction in which an angle of about 45 degrees is formed relative to the pipeline in a plane perpendicular to a direction of the temperature deformation displacement.

According to one aspect of the present disclosure, when the rigid constraint is installed, an installation position point of the rigid constraint on a building structure is moved in advance by a predetermined amount in a direction of the temperature deformation displacement.

The advantageous effects of the present disclosure are as follows: a principle of temperature deformation and a principle of deformation under a seismic load of a pipeline is considered in the present disclosure, theoretical knowledge of these aspects is also put into overall consideration according to characteristics of a rigid constraint, and a correct rigid constraint is applied at a correct position in a correct direction to resist a dynamic load. In this way, a pipeline support design that satisfies both a temperature stress and a seismic stress can be obtained. This arrangement can avoid or reduce the use of snubbers, thereby significantly reducing an investment in power plants or other engineering pipeline constructions having antiseismic requirements.

DESCRIPTION OF THE INVENTION

Figure 1:
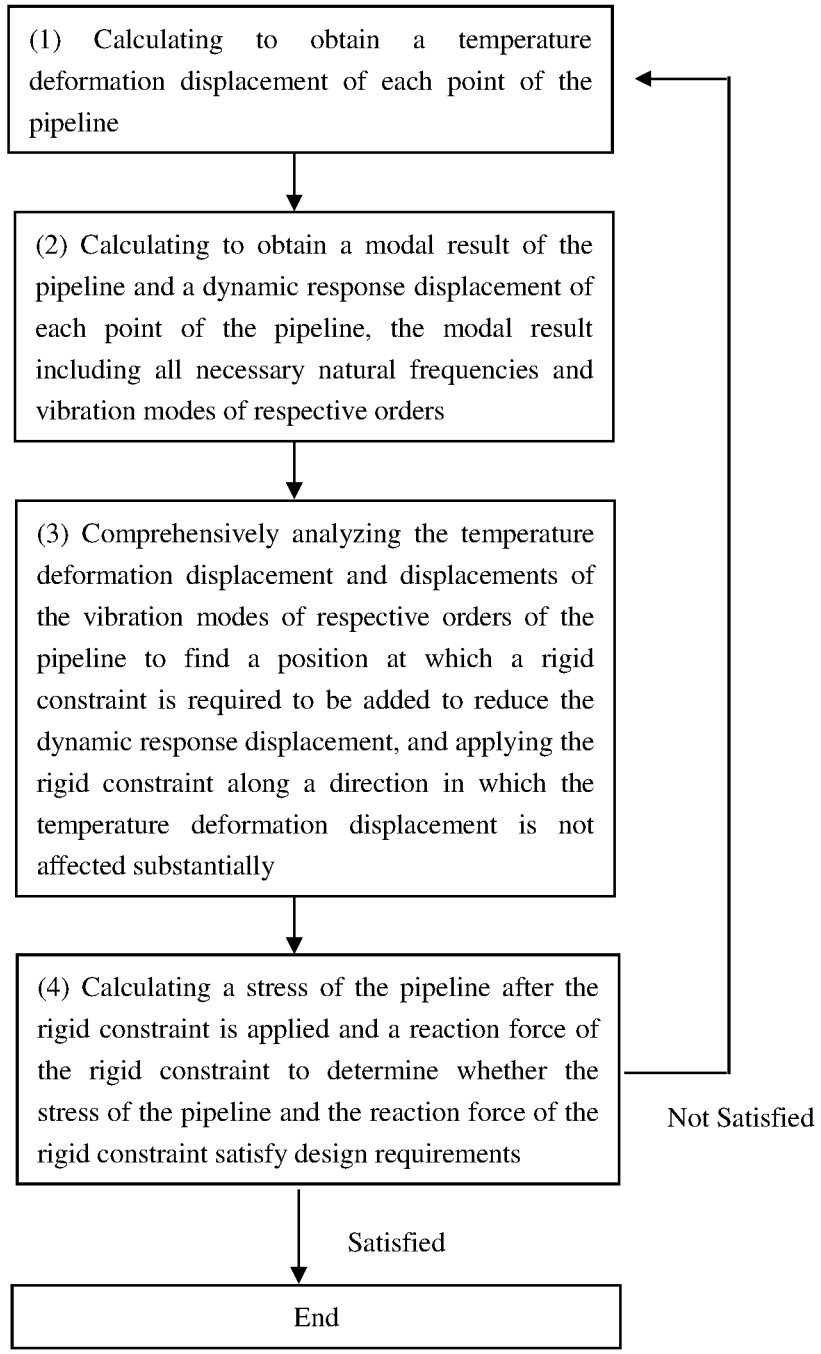
FIG. 1 is a flow diagram showing a design method for resisting a dynamic load in a high temperature pipeline.

The present disclosure will be described in detail below in connection with accompanying drawings and embodiments.

A technical principle adopted in the present disclosure is that a temperature stress is generated by a temperature deformation being subject to a constraint, while the temperature deformation necessarily has a definite direction. In arranging a pipeline, as long as the constraint is released in a temperature deformation direction, a large temperature stress will not be generated. In principle, application of a constraint in a direction perpendicular to the temperature deformation will not have a significant influence on the temperature stress. Therefore, it is necessary to find the temperature deformation displacement under a specific pipeline arrangement, and such deformation displacement ought to be a deformation displacement of each point having a definite direction and a definite magnitude. After that, where the maximum internal force or the maximum internal moment in dynamic results is located and which vibration modes caused the largest result are analyzed, and then a position at which the rigid constraint is to be applied is determined by comprehensively considering a situation of the temperature stress according to a deformation and displacement of the vibration modes. This rigid constraint should not restrict the temperature deformation displacement at this position, that is, the constraint should be applied as much as possible in a direction perpendicular to the temperature displacement direction.

A principle of dynamic response of a structure is described below so that a relationship between vibration modes and a final dynamic response can be seen. First, a dynamic equation of the structure is as follows:

$$M\ddot{U}+C\dot{U}+KU=-M\ddot{I}(t) \quad (1)$$

Wherein, M represents a mass of the structure, C represents a damping of the structure, K represents a rigidity of the structure, U represents nodal displacements of the structure, and $\ddot{I}(t)$ represents a basic acceleration time history of the structure.

By solving an undamped natural vibration, vibration modes $\Phi 1, \Phi 2, \ldots, \Phi n-1, \Phi n$ with the number of n can be obtained.

Simplified from equation (1), the following equation will be obtained, wherein $\omega_i$ is a natural circular frequency of the i-th order of the structure:

$$\ddot{q}_{ix}+2\zeta_i\omega_i\dot{q}_{ix}+\omega_i^2 q_{ix}=-\eta_{ix}\ddot{I}_x(t) \ (i=1, 2, \ldots, n) \quad (2)$$

The maximum value of vibration mode responses can be derived from a theory of seismic force:

$$q_{ix} = |q_{ix}(t)|_{max} = \frac{|\eta_{ix}|}{\omega_i^2}\beta_{ix}k_{ox}g \quad (3)$$

In this equation, $\beta_{ix}$—dynamic amplification factor, a value of $\beta_{ix}$ when $$T = \frac{2\pi}{\omega_i}$$

g—gravity acceleration, $k_{ox}$—g-level acceleration coefficient, which is a seismic coefficient in case of earthquake, and is determined by a seismic intensity, $\eta_{ix}=\phi_i^T M\delta_{ox}$—vibration mode participation coefficient wherein $\delta_{ox}=[1\ 0\ 0\ 0\ 0\ 0\ 1\ 0\ 0\ 0\ 0\ 0\ 1\ 0\ 0\ \ldots\ 1\ 0\ 0\ 0\ 0\ 0]^T$ wherein $\beta_{ix}$ is the dynamic amplification factor, which is given by a seismic response spectrum, and is actually an acceleration coefficient.

A combination of the vibration mode responses can be obtained in the following manner:

$$U = \sqrt{\sum_{i=1}^{NF} \phi_i^2 (q_{ix}+q_{iy}+q_{iz})^2} \quad (4)$$

NF here indicates meaningful vibration modes with the number of NF of the structure, U is the dynamic response of the structure, and this equation means that a total response of the structure is a combined result of the vibration modes of respective orders. There are many methods for acquiring a combination of the vibration mode response of the structure, and an influence of dense frequencies (if a difference between frequencies of the two vibration modes is less than 10%, the two frequencies are regarded to be dense) is generally required to be considered. Different regulations or requirements involve different methods of combining the dense frequencies. The present disclosure only gives a method of marking dense frequencies, and a specific combination method is considered in accordance with the regulations or requirements adopted.

The formula (3) here is fundamental, because the subsequent calculations are based on this formula which represents the most important relationship of a seismic response. That is, the response q of the structure is inversely proportional to the square of the natural circular frequency ω of the structure and is also directly proportional to a response spectrum acceleration. Main conditions for obtaining a seismic response displacement (dynamic response displacement) of the pipeline include natural frequencies of the pipeline and the response spectrum acceleration, and are also relevant to the vibration modes $\phi_i$ of respective orders. The dynamic response displacement is a function of a sum of displacements of the vibration modes of respective orders, which can be seen from the formula (4) in respect of the displacement U.

The following three points can be seen: firstly, the larger the response spectrum acceleration is, the larger the response of the structure is, and they are in a linear relationship; secondly, the lowest frequency produces the greatest influence, that is, the higher frequency produces the smaller influence, and they are in inverse proportion to each other at a ratio of the second power. As a result, only the frequencies of several lower orders (for example, the first to third orders) needs to be considered, and the influence of frequencies of higher orders can be ignored; thirdly, the response of the structure is relevant to the displacements of the vibration modes $\phi_i$ of respective orders, and the response of the structure is mainly in direct proportion to the sum of respective vibration modes $\phi_i$ in lower frequencies. In this way, the position at which the rigid constraint should be applied to effectively reduce the seismic stress can be determined.

As shown in FIG. 1, in the present disclosure, a temperature deformation displacement of each point of a pipeline is first calculated in a step (1), in which a temperature deformation displacement diagram of a pipeline system is obtained, and the temperature deformation displacement diagram here is a three-dimensional graph including a direction and a magnitude of the temperature deformation displacement of each point of the pipeline. Then, a modal result of the pipeline and a dynamic response displacement of each point of the pipeline (i.e., a seismic response displacement) are calculated in a step (2), and the modal result include all necessary natural frequencies and vibration modes of respective orders. After that, a seismic analysis is performed in a step (3) to find a position where a seismic stress or a seismic response displacement is too large and find a position and a direction at/in which a rigid constraint can be effectively applied so as to reduce the seismic stress or the seismic response displacement. At this time, it is necessary to comprehensively analyze the temperature deformation so that the temperature deformation displacement is not restricted or less-restricted (is not affected substantially) when a seismic constraint is applied. In other words, the position at which the rigid constraint is required to be added in the step (3) can not be a position where a direction of the seismic response displacement fully coincides with a direction of the temperature deformation displacement. When a rigid hinged beam bracket is used as a constraint, it should not be simply added directly to a position where only the seismic response displacement is to be constrained. Meanwhile, it is necessary not to restrict the temperature deformation displacement as much as possible, and applying the rigid constraint in a plane perpendicular to a direction of the temperature deformation displacement will not affect the temperature deformation displacement. For example, in a case where a temperature deformation of a certain point is in an X direction, the temperature deformation will not be restricted if the rigid constraint is added within a YZ plane at this time. For a complicated pipeline, as long as the temperature is unitary, the temperature deformation direction of each point of the pipeline is unique, that is, the deformation has only a different magnitude caused by the temperature which is high or low but is constant in the direction. It is easy to determine the position where the seismic stress or the seismic response displacement is large, and it is also easy to find the vibration mode that causes a large seismic stress or a large seismic response displacement through a vibration mode analysis. According to these conditions, in the step (3), the temperature deformation displacement of the pipeline is comprehensively considered, the rigid constraint is applied at a position where the temperature deformation displacement is not affected substantially, and the direction in which the rigid constraint is applied is perpendicular to the direction of the temperature deformation displacement. However, contribution to reduce the seismic displacement should also be taken into account. It is to be noted that this contribution may not be so direct and the contribution of the rigid constraint in its constraining direction may be reduction of a seismic deformation at other positions of the pipeline. Finally, a stress of the pipeline after the rigid constraint is applied and a reaction force of the rigid constraint are calculated in a step (4) so as to determine whether the stress of the pipeline and the reaction force of the rigid constraint satisfy design requirements. Due to the added rigid constraint, a whole model of the pipeline is changed, the vibration modes and the seismic response displacement at this time are necessarily changed, and the temperature deformation displacement will also be affected. Calculation for the modified model will result in a temperature deformation and a seismic deformation under a new condition. If a result of a new model is still not satisfactory, that is, when it is determined that the stress of the pipeline after the rigid constraint is applied and the reaction force of the rigid constraint do not meet the design requirements in the step (4), the same method can be used to modify the design and make reanalysis from the step (1), as shown in FIG. 1.

In one embodiment, in the step (3), a plurality of rigid constraints are applied at one position where the temperature deformation displacement is not affected substantially, and a direction in which a resultant force of the plurality of rigid constraints is exerted on the pipeline is perpendicular to the direction of the temperature deformation displacement at the one position of the pipeline.

In one embodiment, in the step (3), a plurality of rigid constraints are applied at each of a plurality of positions where the temperature deformation displacement is not affected substantially, and a direction in which a resultant force of the plurality of rigid constraints is exerted on the pipeline is perpendicular to the direction of the temperature deformation displacement at each position of the pipeline.

As described above, the number of the plurality of rigid constraints applied at the one position or each of the plurality of positions where the temperature deformation displacement is not affected substantially are at least two, and generally two rigid constrains can meet engineering requirements, of course, three, four or more rigid constrains may also be provided. By providing at least two hinged beams at each position, it can be ensured that the temperature deformation displacement of the pipeline perpendicular to the constraining direction is not affected by the rigid constraint, and it can be ensured that the constraint exerted on the pipeline is a bi-directional constraint in a plane formed by the two hinged beams, the bi-directional constraint being capable of resisting a dynamic load.

In one embodiment, the dynamic load is a seismic load, each rigid constraint is a hinged beam, and only a unidirectional compressive or tensile force is produced in the hinged beam by the pipeline under the seismic load.

For example, the hinged beam that is commonly used as a rigid constraint in engineering may be a bracket with pins on both ends, and the hinged beam only provides a one-way constraint along an axial direction of the hinge beam without applying a rotational constraint to the pipeline, i.e., the pipeline is rotatable relative to the hinged beam. In addition, a spherical hinged beam or a spherical hinged bracket can also be used as a connection form for ends of the rigid constraint in the present application.

Figure 2:
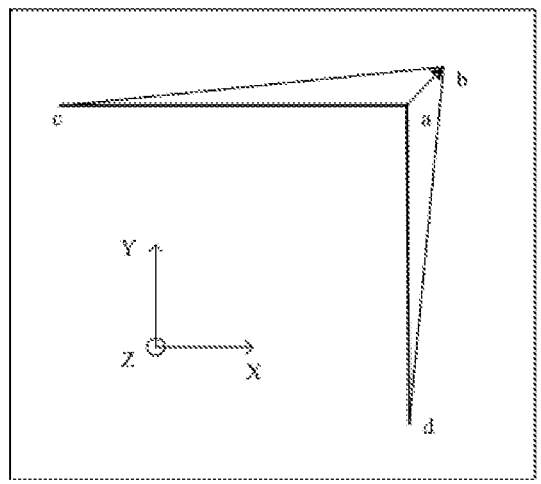
FIG. 2 is a schematic diagram showing a deformation (within an XY plane) of an intersection point of two straight pipelines when only temperature is considered.
Figure 3:
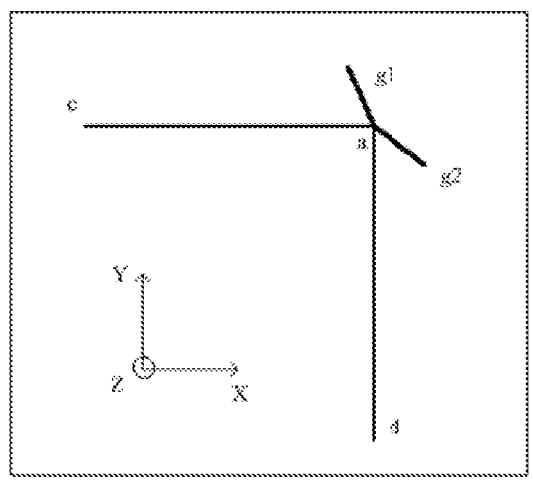
FIG. 3 is a schematic diagram showing application of two rigid brackets at a point a in the two straight pipelines as shown in FIG. 2 in an embodiment.
Figure 4:
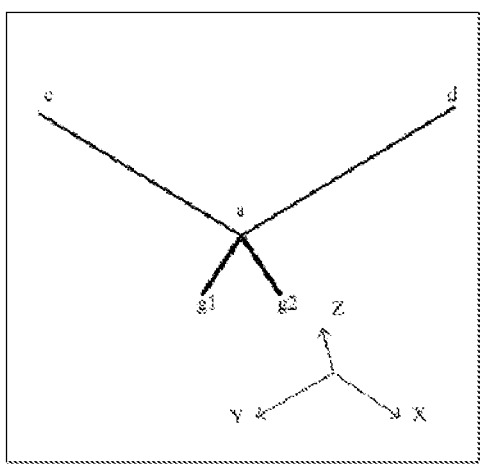
FIG. 4 is a three-dimensional schematic diagram showing the pipelines and the brackets as shown in FIG. 3.

Actual engineering effects of the present disclosure will be described below in connection with the accompanying drawings and the embodiments. FIG. 2 and FIG. 3 are top views in a XY plane (a horizontal plane), wherein a Z-axis direction is perpendicular to a plane in which the paper is present (called as a paper plane below) and is directed to an outter side of the paper plane. FIG. 4 is a three-dimensional perspective view showing that a direction in which the rigid constraints are applied is not in the horizontal plane, wherein the Z-axis direction obliquely intersects the paper plane and is directed to an inner side of the paper plane.

FIG. 2 shows an assumed pipeline arrangement. Due to an effect of the temperature load, a large temperature deformation is produced in the pipeline. An intersection point of two straight pipelines ac and ad will be deformed from a point a to a point b. In FIG. 2, both of the two straight pipelines ac and ad are located in the horizontal plane (the paper plane), and the temperature deformation displacement of the intersection point of the pipelines is a displacement vector directed from the point a to the point b in the paper plane. The displacement vector is also referred to as a temperature deformation displacement line hereinafter. If the pipelines are so arranged, the maximum seismic deformation will be in a direction perpendicular to the paper plane (a Z-direction), the maximum seismic stress will occur at roots on both ends of each of the pipelines, and the vibration displacement is expected to be in the Z-direction (a vertical direction). At this time, the problem can be solved if a rigid constraint is applied in the Z-direction at the point a. However, considering that the seismic displacement of the pipeline is multi-directional, if the temperature is high or the pipeline is long, the temperature deformation will be large, in this case, it is not enough to apply the rigid support only in one direction because the vibration in the horizontal direction is not restricted. For adding a constraint in a horizontal direction, it is common to install a snubber, because the temperature deformation displacement can not be limited excessively but the vibration displacement should be restricted. Through the foregoing principle analysis and the method analysis of the present disclosure, as shown in FIG. 4, two rigid constraints g1 and g2 with an intersection angle of 90 degrees are applied along a direction in which an angle of about 45 degrees is formed relative to the pipelines ac and ad respectively in a plane perpendicular to the temperature deformation displacement line shown in FIG. 2 (i.e., in a plane perpendicular to the paper plane or the horizontal plane). That is, the rigid constraints g1 and g2 extend in a direction oblique to the horizontal plane, projections of vectors of directions in which the rigid constraints g1 and g2 are applied in the paper plane (the XY plane) form an angle of about 45 degrees (a planar angle in the XY plane) with respect to the pipelines ac and ad respectively, and the two rigid constraints g1 and g2 form an angle of 90 degrees each other (a spatial angle rather than a planar angle). In order not to affect the temperature deformation displacement of the pipelines, it is necessary to cause a direction in which a resultant force of the two rigid constraints g1 and g2 is exerted on the intersection point a of the two pipelines to be substantially perpendicular to the direction of the temperature deformation displacement at that point. It should be pointed out that the same effect can be achieved by using angles other than 90 degrees as the intersection angle of the two rigid constraints g1 and g2. In this way, not only the vertical displacement is restricted, but also the horizontal displacement is restricted, while the temperature deformation is not restricted, which satisfies the requirements for both the temperature operating conditions and the seismic operating conditions. Moreover, the use of rigid supports is much more economical than use of snubbers.

Typically, a rigid constraint is installed at a position at which the antiseismic rigidity is required to be increased in the pipeline, and the rigid constraint is rooted in (fixed to) a building structure of a room in which the pipeline is located. In one embodiment, as shown in FIG. 3, when the rigid constraints are installed, an installation position point of the rigid constraints g1 and g2 on the building can be first moved in advance by a predetermined amount in the temperature deformation displacement direction (from a to b) in a plane parallel to the XY plane, and then the rigid constraints g1 and g2 are installed at the installation position point. Thus, when a deformation node on the pipelines is deformed from a displacement initial point a to a maximum displacement point b, the stress of the pipeline after the rigid constraints are applied and the reaction force of the rigid constraints are reduced as compared with a case where the installation position of the rigid constraints is not moved in advance, and it can also be ensured that the influence of the rigid constraints on the temperature deformation displacements of the pipelines is smaller. The predetermined amount may be ½, ⅓, ¼ etc., of the maximum displacement amount from a to b shown in FIG. 2.

It is to be noted that the above specific embodiments are merely exemplary, and various improvements and modifications made by a person skilled in the art based on the above embodiments under an inspiration from the present disclosure fall within the scope of the present patent. It is to be understood by the person skilled in the art that the above concrete description is just for explanation purpose and is not intended to limit the scope of the present disclosure. The scope of the present disclosure is defined by the claims and their equivalents.

The invention claimed is:

1. A replacement method for resisting a dynamic load in a heat resistant pipeline while reducing use of snubbers, the pipeline being mounted with a plurality of snubbers at a plurality of positions to satisfy requirements for thermal expansion and earthquake proof, the replacement method comprising the following steps:

a first calculation step, calculating to obtain a temperature deformation displacement of each point of the pipeline after a part or an entirety of the snubbers is removed from the pipeline;

a second calculation step, calculating to obtain a modal result of the pipeline and a dynamic response displacement of each point of the pipeline after the part or the entirety of the snubbers is removed from the pipeline, the modal result including all necessary natural frequencies and vibration modes of respective orders;

an analysis step, determining a position at which a rigid constraint is to be applied and a direction along which the rigid constraint is to be applied based on both of the temperature deformation displacement and displacements of the vibration modes of respective orders of the pipeline after the part or the entirety of the snubbers is removed from the pipeline, wherein the position at which the rigid constraint is to be applied is a position in which the dynamic response displacement is required to be reduced among respective points of the pipeline, and the direction along which the rigid constraint is to be applied is any one in a plane perpendicular to a direction of the temperature deformation displacement at the position at which the rigid constraint is to be applied;

a determination step, calculating a stress of the pipeline after the rigid constraint is applied and a reaction force of the rigid constraint to determine whether the stress of the pipeline and the reaction force of the rigid constraint satisfy replacement requirements; and a replacement step, replacing the part of the entirety of the plurality of snubbers removed from the pipeline with the rigid constraint when it is determined that the stress of the pipeline and the reaction force of the rigid constraint satisfy the replacement requirements, wherein when the rigid constraint is installed, an installation position point of the rigid constraint on a building structure is moved in advance by a predetermined amount in a direction of the temperature deformation displacement.

2. The replacement method according to claim 1, wherein a temperature deformation displacement diagram of the pipeline is obtained in the first calculation step, and the temperature deformation displacement diagram is a three-dimensional graph including a magnitude and a direction of the temperature deformation displacement of each point of the pipeline.

3. The replacement method according to claim 1, wherein the dynamic response displacement in the analysis step is a combination of the displacements of the vibration modes of respective orders.

4. The replacement method according to claim 1, wherein the position at which the rigid constraint is required to be applied in the analysis step is a position where a direction of the dynamic response displacement does not coincide with a direction of the temperature deformation displacement.

5. The replacement method according to claim 1, wherein when it is determined that the stress of the pipeline or the reaction force of the rigid constraint does not meet the replacement requirements in the determination step, returning to the first calculation step for redetermining the position at which the rigid constraint is to be applied and the direction along which the rigid constraint is to be applied.

6. The replacement method according to claim 1, wherein in the analysis step, a plurality of rigid constraints are applied at one position where the temperature deformation displacement is not affected substantially, and a direction in which a resultant force of the plurality of rigid constraints is exerted on the pipeline is perpendicular to a direction of the temperature deformation displacement at the one position of the pipeline.

7. The replacement method according to claim 1, wherein in the analysis step, a plurality of rigid constraints are applied at each of a plurality of positions where the temperature deformation displacement is not affected substantially, and a direction in which a resultant force of the plurality of rigid constraints is exerted on the pipeline is perpendicular to a direction of the temperature deformation displacement at each position of the pipeline.

8. The replacement method according to claim 1, wherein the dynamic load is a seismic load, the rigid constraint is a hinged beam with pins on both ends, and a unidirectional compressive or tensile force is only generated in the hinged beam by the pipeline under the seismic load.

9. The replacement method according to claim 1, wherein two rigid constraints with an intersection angle of 90 degrees are applied in the plane perpendicular to the direction of the temperature deformation displacement.

* * * * *